United States Patent [19]

Pricone et al.

[11] Patent Number: 4,618,518
[45] Date of Patent: Oct. 21, 1986

[54] RETROREFLECTIVE SHEETING AND METHODS FOR MAKING SAME

[75] Inventors: Robert M. Pricone, Vernon Hills; William N. Roberts, Niles; Richard Zanotti, Hoffman Estates, all of Ill.

[73] Assignee: Amerace Corporation, Hackettstown, N.J.

[21] Appl. No.: 747,103

[22] Filed: Jun. 20, 1985

Related U.S. Application Data

[63] Continuation-in-part of Ser. No. 640,009, Aug. 10, 1984, abandoned, which is a continuation-in-part of Ser. No. 533,068, Sep. 19, 1983, abandoned.

[51] Int. Cl.⁴ ............................ D06N 7/00; B32B 3/00
[52] U.S. Cl. ...................................... 428/40; 350/102; 350/103; 350/105; 350/109; 427/164; 427/180; 427/212; 428/161; 428/323; 428/331; 428/338; 428/339; 428/343; 428/352; 428/354; 428/542.6
[58] Field of Search .............. 428/161, 323, 173, 338, 428/331, 339, 343, 352, 354, 542.6; 427/164, 180, 212; 350/102, 103, 105, 109

[56] References Cited

U.S. PATENT DOCUMENTS

| | | | |
|---|---|---|---|
| 1,691,708 | 8/1972 | Egleson | 428/173 |
| 3,684,348 | 8/1972 | Rowland | 428/40 |
| 3,810,804 | 5/1974 | Rowland | 428/29 |
| 3,830,682 | 8/1974 | Rowland | 428/161 |
| 3,924,929 | 12/1975 | Holmer et al. | 40/612 |
| 4,025,159 | 5/1977 | McGrath | 350/105 |
| 4,073,568 | 2/1978 | Heasley | 350/102 |

FOREIGN PATENT DOCUMENTS

1017060 1/1966 United Kingdom ............... 350/105

*Primary Examiner*—George F. Lesmes
*Assistant Examiner*—S. A. Gibson
*Attorney, Agent, or Firm*—David Teschner; Ronald A. Sandler

[57] ABSTRACT

A retroreflective relatively flexible laminate sheet construction has a thermoplastic web with a smooth light-receiving first side and a second side coextensive with said first side. A retroreflective pattern is formed on the second side. A slurry of granular material is deposited on the second side to cover selected portions of the formed pattern with remaining portions of the formed pattern devoid of the granular material, and said slurry is dried or cured to produce a well-defined pattern. A layer of backcoating material is deposited on the second side to overlay the granular material, the backcoating material contacting the thermoplastic web where no granular material has been deposited, thereby encapsulating the granular material between the second side and the backcoating layer. An added, outer layer provides additional weather protection for the thermoplastic web. Methods are detailed to manufacture the laminate, and compositions of backcoating mixtures also are disclosed.

67 Claims, 7 Drawing Figures

RETROREFLECTIVE SHEETING AND METHODS FOR MAKING SAME

This application is a continuation-in-part of copending U.S. application Ser. No. 640,009, filed Aug. 10, 1984, entitled "Retroreflective Sheeting and Methods for Making Same", which was a continuation-in-part of U.S. application Ser. No. 533,068, filed Sept. 19, 1983, both now abandoned, and assigned to the same assignee as the prior application.

BACKGROUND OF THE INVENTION

Retroreflective sheeting has particular use in making highway signs, street signs and the like, and is now employed extensively. The Federal government has recognized two primary types of retroreflective sheeting: glass bead and cube-corner. Such approved sheeting materials are found in a specification entitled "FP-79", published by the U.S. Department of Transportation, Federal Highway Administration. Specification FP-79 presently has been adopted as a purchasing standard by many state highway departments, and it sets forth certain minimum specifications which must be met by retroreflective sheeting of the cube-corner type. Included among the specified characteristics are those for reflectivity, color, flexibility of material and resistance to cracking and weathering.

Cube-corner type reflector elements generally provide a higher specific intensity at 0.2° observation angle and 0° entrance angle than do glass bead type reflector elements, but, to applicant's knowledge, no one successfully has furnished a sheeting material in commercial quantities which generally will meet the requirements for the Class IIB sheeting set forth in the aforementioned FP-79 specification. It therefore is a primary object of the present invention to provide a unique sheeting product which will substantially meet such specified criteria and which can be produced in accordance with the novel methods disclosed herein in an economical fashion and in commercial quantities.

Retroreflectivity is achieved by cube-corner type reflector elements primarily through the principle of total internal reflection. It is well known that any surface contact made by another material with the faces of the cube-corner elements generally has a deleterious effect on the reflectiveness of the reflector element.

However, when all of the element faces are metallized, or mirrored, then, rather than relying upon total internal reflection, retroreflection is achieved by specular reflection from the mirrored faces. Generally, metallizing will provide a grayish or black coloration under certain daylight onditions vis-a-vis unmetallized cube-corner type elements.

The present invention relates generally to methods and apparatus for producing retroreflective sheeting constructins and, more particularly, to methods and apparatus for producing a flexible laminate sheeting construction including an upper thermoplastic sheet, the reverse of which is provided with a repeating, retroreflecting pattern of fine or precise detail, a backcoating to protect the formed pattern, and a selectively applied intermediate layer allowing bonding of the backcoating to overlay the formed pattern on the thermoplastic sheet while preserving and enhancing the retroreflective properties of both the formed pattern and the laminated sheet. More precisely, the present invention is applicable to the production of cube-corner type retroreflective sheeting laminates.

Within the art of designing reflectors and retroreflective material, the terms "cube-corner" or "trihedral," or "tetrahedral" are recognized in the art as describing structure or patterns consisting of three mutually perpendicular faces, not limited to any particular size or shape of the faces, or the orientation of the optical axis of the cube-corner element. Each of the cube-corner faces can assume a different size and shape relative to the others, depending upon the angular reflective response characteristics desired, and the cube forming techniques employed.

Examples of prior cube-corner type reflectors may be found in U.S. Pat. No. 1,906,655, issued to Stimson, and U.S. Pat. No. 4,073,568, issued to Heasley. Stimson shows reflex light reflector including an obverse face and a reverse light-reflecting face consisting of a plurality of cube-corner type reflector elements with each such element having three mutually perpendicular surfaces adapted for total internal reflection of light impinging thereof from the obverse face. Heasley describes a cube-corner type reflector in the form of a rectangular parallelpiped.

It long has been desired to obtain the benefits of cube-corner reflective properties in the form of fexible sheeting. As noted above, one advantageous aspect of such sheeting is in the manufacture of highway and street signs, markers and the like, where graphics are printed, painted, silk-screened or otherwise applied to a highly reflective substrate mounted to a flat, stiff, supportive surface. Flexible retroreflective sheeting, when used as such a substrate, can be stored and shipped while wound onto rolls, and can readily be cut or otherwise formed into the desired shape and size required for a particular application. The reflective nature of the sheeting allows such signs, markers, and the like to reflect light from a vehicle's headlights, permitting the item to be read by the driver, without requiring a permanent light source to illuminate the sign or marker.

Production of such retroreflective sheeting has been made practicable by apparatus and methods to form precise cube-corner patterns in greatly reduced sizes on flexible thermoplastic sheeting. Desireably, such sheeting may then be assembled in the form of self-adhesive laminates.

Others have recognized the desireability of producing retroreflective thermoplastic material in sheet form. U.S. Pat. Nos. 2,310,790, 2,380,447, and 2,481,757, granted to Jungersen, described and teach the shortcomings of previously-known reflectors manufactured from glass, and the advantages inherent in providing a reflective material in a less fragile and more flexible sheet form. While so suggesting, it is not known if Jungersen in fact ever commercialized any product disclosed in such patents.

In U.S. Pat. Nos. 4,244,683 and 4,332,847 issued to Rowland, the desirability of manufacturing cube-corner retroreflective sheeting in a continuous, nonstop process is presented, but the approach selected by Rowland is a "semi-continuous" process (Rowland U.S. Pat. No. 4,244,683, column 2, lines 18–38), presumably so-called because the process requires frequent repositioning of the molding plates.

In U.S. Pat. No. 3,187,068, issued to DeVries, et al., continuous production of reflective sheeting is disclosed, utilizing encapsulated glass microspheres as the reflecting medium. DeVries, et al. describes the application of a pressure-activated adhesive layer to such sheeting to enable attachment of sheeting setments to selected surfaces.

In U.S. Pat. No. 3,649,352, issued to Courneya, a beaded sheeting construction is described, portions of which become reflective when heate, and which includes a pressure-activated adhesive layer allowing attachment of the sheeting construction to other articles.

Palmquist, et al. U.S. Pat. No. 2,407,680 teach the utilization of glass microspheres of beads included as the reflective elements in flexible sheet forms; Tung, et al., in U.S. Pat. No. 4,367,920, also describes a laminated sheet construction using glass microspheres as the reflective elements.

A common problem in the construction of reflective laminate sheeting is to find means to bond the layers firmly together in a way which preserves the required retroreflective qualities of the reflective elements selected for use. An example of prior effects to solve this problem with respect to glass microspheres may be seen in U.S. Pat. No. 3,190,178, issued to McKenzie, wherein a cover sheet or film is secured over exposed glass microspheres by use of die elements which force a portion of the material in which the glass microspheres are embedded into contact with the cover sheet. The die elements thus create a grid pattern on the resulting sheeting construction, with each grid forming a separate cell. Within each cell, an air space is maintained between the microspheres and the cover sheet, and incident light traverses the cover sheet and the air space to be retroreflected by the embedded microspheres.

Holmen, et al., U.S. Pat. No. 3,924,929, teach a cube-corner type upper rigid sheet having upstanding walls, or septa, integrally formed as part of the cube pattern. The septa extend to form a regular geometric pattern of individual cells, with the septa extending at least as far from the upper sheet as the cube-corner elements. A particulate packing may be used to fill each of the cells, and a backing sheet is then attached to the rear of the upper sheet, with the septa service as the attachment sites. Holmen, et al. use relatively large cube-corner elements fashioned as rigid sections bound to a flexible back, and has limited flexibility in use.

In McGrath, U.S. Pat. No. 4,025,159, the cellular concept is described with respect to cube-corner type retroreflective sheeting, through us of dies to force a carrier film into contact with the reverse side of the cube-corner sheeting. The carrier film must then be cured with radiation to bind it to the cube-corner sheeting and, as in McKenzie, the resulting cells include an airspace extending between the carrier film and the reverse side of the cube-corner sheet. The air cell structure apparently was intended to provide a hermetically sealed cell, avoiding the need for metalizing the cube-corner elements, and providing an air/thermoplastic interface to enhance retroreflection.

None of the foregoing teach the assembly of molded or embossed cube-corner type retroreflective sheeting into self-adhesive laminates which protect and enhance the reflective properties of the sheeting without requiring the use of dies or of integrally-molded septa or walls included as part of the cube pattern. Further, none of the foregoing permits the material to benefit from encapsulated sections of cube-corner elements while enhancing and substantially meeting the requirements specified in the aforementioned DOP FP-79 Specification.

BRIEF DESCRIPTION OF THE INVENTION

A thermoplastic sheet or web is provided on its reverse side with a retroreflective cube-corner type pattern. A thin layer of a liquid vehicle or solvent containing hydrophobic granular material (such as silica treated with silanes) is deposited on the reverse side of the web, as by screen printing, in a pettern leaving selected sites devoid of granular material. The web is then dried to drive off the solvent and, thereafter, a water-based backcoating is applied over the granular material pattern, with portions of the backcoating being in direct contact with the thermoplastic web at those sites on the web devoid of granular material. Thereafter, the backcoating is dried or cured, and a layer of adhesive such as pressure-sensitive or heat-activated adhesive is applied thereto. This procedured thus enables the assembly of patterned web material into laminates which include an activated adhesive layer while protecting the retroreflective properties of the precisely formed cube-corner pattern.

A thin layer of a hydrophobic silica mixture is then screened or sprayed onto the embossed reverse surface of the laminated thermoplastic web in a diamond-like pattern, and is thereafter dried. A water-based backcoating mixture of certain formulation is next deposited over the silica layer to encapsulate the silica and to contact the thermoplastic sheet where no silica was deposited. The backcoating then is heat dried and/or cured to form a continuous film. A pressure-sensitive or heat-activated adhesive then is applied to the cured backcoating layer, with the adhesive protected by a release sheet which is removed when the laminate is applied to an object.

In the preferred embodiment, an outer protective layer of thermoplastic material, used to provide additional weather resistant properties, is secured to the thermoplastic web on the side opposite from that upon which the retroreflective pattern is formed during or before the cube forming process.

The completed laminate is then cut, trimmed, or otherwise shaped for application to supporting surfaces, such as street or highway signs, and graphics or other indicia may thereafter be painted, printed, silk-screened, or otherwise affixed to the uppermost surface of the laminate, thus producing a readily and easily constructed highly retroreflective finished product.

These and further aspects of the present invention will become more apparent upon consideration of the accompanying drawings, wherein:

DETAILED DESCRIPTION OF THE DRAWINGS

Figure 3:
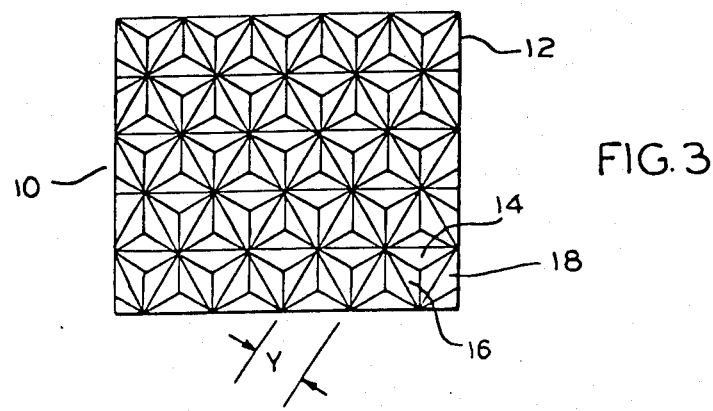
FIG. 3 is a greatly enlarged plan view illustrating a section of the formed surface of reflective sheeting comprising one aspect of the present invention.

Referring now to FIG. 3, the numeral 10 indicates generally a segment of cube-corner type retroreflective themoplastic web used in forming the laminate of the present invention. As seen in FIG. 3, there is depicted the rear surface of a portion of flexible retroreflective sheeting 12 fashioned from transparent thermoplastic material in web form which has formed thereon, preferably by embossing, a retroreflective and repeating pattern of cube-corner reflector elements characterized by cube faces 14, 16 and 18. In a preferred aspect of such sheeting, sheet 12 is formed from an impact-modified acrylic material having UV inhibitors or absorbers added thereto, and which, prior to embossing, had parallel front and back surfaces and was initially on the order of about 0.006 inches thick. One such material is know as Plexiglas DR, sold by the Rohm and Haas Company.

Figure 2:
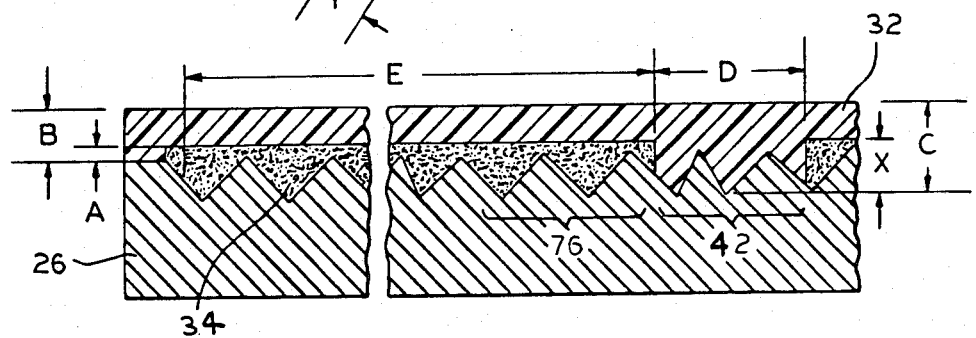
FIG. 2 is a view along line 2—2 of FIG. 1.

The cube-corner pattern formed on sheeting 12 is formed in an optically precise, finely-detailed pattern. For example, as seen in FIG. 2, the depth to which the cube-corner pattern is embossed onto sheet 12 may be on the order of 0.00338 inch, (dimension X). As shown at dimension Y in FIG. 3, the cubes formed on sheet 12 may be spaced apart by a distance on the order of about 0.0072 inch, for the depth as shown at X as set forth above. While the cube pattern shown in FIG. 1 illustrates cubes formed with their optical axes normal to the face of sheet 12, it is to be understood that other versions and patterns may also be utilized as forming the retroreflective web of the laminate of the present invention.

Figure 1:
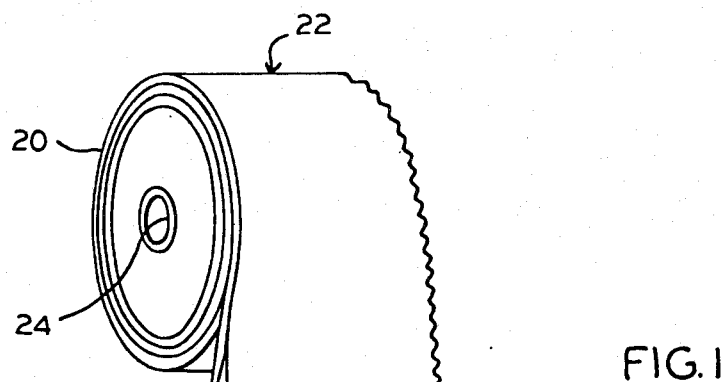
FIG. 1 is an enlarged perspective and somewhat schematic view of one preferred aspect of the retroreflective sheeting of the present invention as a completed construction.
Figure 1:
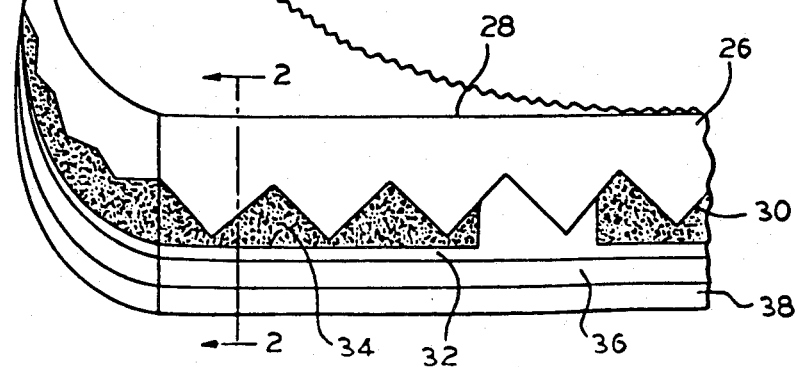

Referring now to FIG. 1, the numeral 20 indicates generally a roll of retroreflective laminate 22 manufactured in accordance with preferred aspects of the present invention to be described hereinbelow. As herein shown, laminate 22 is rolled onto a core 24. A thermoplastic web 26 having a front or obverse surface 28 and a rear or reverse surface 30 upon which is embossed the cube-corner type retroreflective pattern is illustrated in FIG. 3. The thermoplastic web 26 may be on the order of about 6 mils (0.006 inch) in thickness.

Bonded to the reverse surface 30 of the thermoplastic web 26 is backcoating or film 32. In a preferred aspect of the present invention, a hydrophobic granular silica material 34 is interposed between the backcoat film 32 and the reverse side 30 in a manner to be described hereinbelow.

In accordance with a preferred embodiment of the present invention, a layer of adhesive 36 is bonded to a release sheet 38 in a presently well-known fashion, and is thereafter bonded to cured backcoat film 32 in order to provide a finished laminate 22 which includes a pressure-sensitive or heat-activated adhesive layer 36 applied to sheeting 12 in a manner which preserves the retroreflective qualities and properties of the cube-corner pattern embossed thereon. The release sheet 38 is used to protect adhesive layer 36 until it is desired to apply laminate 22 to a given surface.

Figure 4:
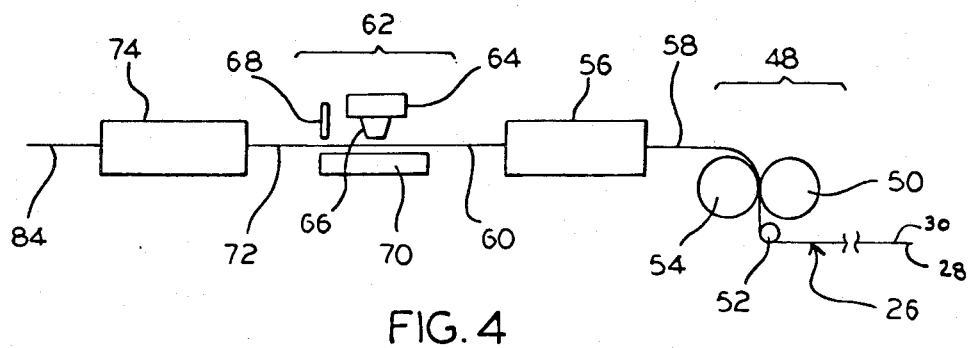
FIG. 4 is a somewhat schematic and symbolic view of the processes and machinery utilized in a preferred aspect of the present invention.

FIG. 4 shows, in schematic form, a preferred arrangement of equipment and sequence of operations to produce a retroreflective sheeting laminate of the type shown in FIG. 3.

The application of adhesive directly to the reverse side of a cube-corner embossed thermoplastic web 26 will cause undesirable and unacceptable loss of retroreflective capability. This arises from the contact of the adhesive material with the obverse side of embossed thermoplastic web 26, i.e., the filling of the "valleys" formed by the embossed pattern and the subsequent interface formed between substances that are too similar in refractive indices to produce adequate retroreflection, so the transparent film can no longer utilize the phenomenon of total internal reflection to efficiently effect retroreflection of light. To solve this problem, a substantial portion of the cube-corner pattern either must be hermetically sealed with an air space between the back wall and the cube-corner elements, or the cube-corner elements must be backed in a way which would preserve the retroreflective properties of the formed web while providing sites for firm attachment of an adhesive layer (or other adhesive material). Without such protection, and without such attaching sites, the use of, and effectiveness of a retroreflective embossed web is seriously compromised and curtailed.

Unexpectedly, use of hydrophobic granular materials has been found to afford such protection of optical properties. Among such materials are xylenated glass particles, powdered silicone rubber, and silane-treated silica.

As part of the present invention, it has been found that a hydrophobic silica mixture consisting principally of amorphous silica treated with silanes, when used to fill the valleys formed by the embossed pattern, preserves the retroreflective properties of the formed pattern for most practical purposes. Again, it is not known precisely why this effect obtains: it has been theorized that the point contact of granules with the reverse face of the embossed thermoplastic web acts to preserve the retroreflective properties of the pattern, perhaps by preserving a sufficient air interface with the reverse side of the cube-corner pattern. However, the present invention obtains excellent results even where the primary silica particles used are significantly smaller than, for example, the particles discussed in prior art patents such as Holmen, et al., U.S. Pat. No. 3,924,929.

Use of such silica offers advantages such as low price, easy availability, and ease and precision of formulation. It further provides unique color and reflective characteristics to the film which improves the appearance of the film even relative to the glass bead types heretofore commonly used.

As discussed hereinabove with respect to the Holmen, et al. reference, others have attempted to solve the problem of loss of reflectivity by providing upstanding walls or septa as part of the rigid molded front face pattern, with the septa forming individual pockets for the application of granular compounds having particle sizes far in excess of the silica particles used in the present invention. The disadvantages to such an approach, particularly with respect to the cube-corner type embossed pattern utilized in the present invention are manifest. Use of rigid septa limits the size and shape of the cell. A separate mold must be formed for each type of retroreflective sheeting requiring a cell size other than that formed in the original mold. What is meant by the term "cell size" is the area bounded by or closed off by the walls to form a single pocket for the granular backing material.

Formation of such septa in a relatively rigid mold pattern manufactured to as fine and precise a degree of detail as that shown in the present invention also may cause problems with respect to stripping the formed thermoplastic web from the forming tool. This may particularly be a problem where the septa or walls extend inwardly into the mold to a distance greater than the depth of the cube-corner pattern.

A preferred embodiment of the present invention includes the mixing of a hydrophobic silica mixture using hydrophobic silica, organic solvents, and thickeners, and the application of this mixture, while in a liquid form, to the reverse side of the formed thermoplastic web in a desired pattern. One advantage of the present process and product is that the pattern can conveniently be changed to effect changes in reflective capability of the film, without changing the tools used in forming the embossed web. Thereafter, the partially coated or imprinted thermoplastic web is passed throught a drying oven which drives off the solvents used to form the mixture, thereby drying the pattern on the thermoplastic sheet. The pattern in which the silica is applied to the thermoplastic web leaves selected portions or sites on the formed face of the thermoplastic web devoid of silica.

Figure 5:
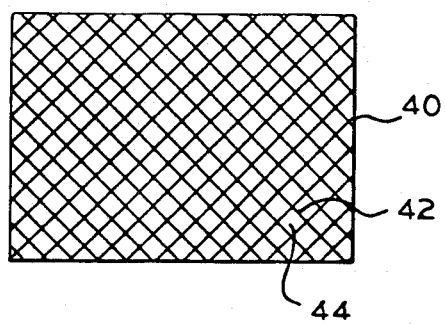
FIG. 5 is a plan view of one form of screen pattern used to apply the hydrophobic granular layer of the present invention.

Referring now to FIG. 5, the numeral 40 indicates generally such a selected pattern. Each runner or path 42 represents an area on the reverse surface of thermoplastic web 26 where no silica has been deposited. Each square or diamond-shaped area 44 represents an area on the surface of thermoplastic web 26 onto which the silica misture has been deposited.

Figure 6:
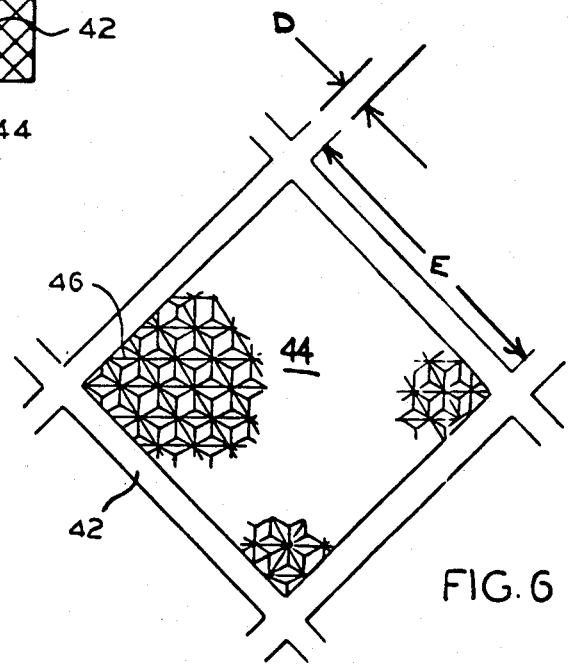
FIG. 6 is an enlarged view, in partial detail, of an individual cell of the sheeting of the present invention.

As seen in FIG. 6, the actual percentage of area covered by the silica mixture is determined by the thickness or width of each runner or path 42, and the pattern selected for deposition of the silica, with the cell 44 having an area bounded by the runners 42, and fully available for the reception and retroreflection of incident light by the embossed retroreflective patterns shown partially at 46.

Referring now to FIG. 4, it may be seen that thermoplastic web 26 may be drawn directly from an associated forming machine (not herein specifically shown) in a continuous process, or may be drawn from a separate supply reel onto which the embossed web 26 has been wound (not herein specifically shown). If desired, web 26 may be supported by a backing sheet (not herein specifically shown) coextensive with obverse face 28, leaving reverse surface 30 exposed.

It should be noted that reference to web 26 also includes reference to a laminate formed by web 26 and a backing sheet such as described hereinabove.

Web 26 is drawn by, for example, powered rollers (not herein specifically shown), to silica mixture application station 48. As herein diagrammatically shown, a preferred means and method of applying the silica mixture to web 26 may be accomplished through use of a screen-printing drum 50 which has mounted about the outer periphery thereof, a metal screen formed to provide the shape or pattern to which it is desired to apply the silica mixture. The mixture is forced under pressure from the interior of screen-printing drum onto the reverse side 30 of the thermoplastic web 26. As herein shown, the web 26 is direct by idler roller 52 to pass between the screen-printing drum 50 and a backing roller 54.

A preferred form of the apparatus utilized to apply the silica mixture at application station 48 consists of a drum printer manufactured by Stork Brabant BV of Boxmeer, Holland, of the type having a drum with electroformed mesh screens over which a photo-resist pattern (such as used for conventional silk screen) may be mounted, with a screen pattern providing a diamond cell size in the range of from about 0.096 inch to 0.300 inch, and a runner or cell wall width of from about 0.010 inch to about 0.050 inch. Variations in the shape of the cells, pattern repeat of the cells, and width of the runners may be accomplished by changing the printing screen used on screen-printing drum 50. Also, the width of the web may be of various sizes, and the printing screens used will be of a compatible width.

In its preferred form, the silica mixture is made from a hydrophobic silica such as that manufactured by the Pigments Division of Degussa, of Frankfurt, West Germany, under the trade designation Sipernat D10. A preferred composition of the mixture includes hydrophobic silica in a mixture containing approximately 98 percent silane-treated silicon dioxide ($SiO_2$); 0.8 percent sodium oxide ($Na_2O$), and 0.8 percent of sulfur trioxide ($SO_3$); a non-polar aliphatic hydrocarbon solvent carrier; a polar solvent; and, where desired or required, a thickening agent. It has been found that certain types of mineral spirits may have deleterious effects upon the preferred web material. One aliphatic non-polar hydrocarbon solvent successfully used is low odor mineral spirits, and a workable mixture has been created through use of an organic alcohol, preferably n-butanol, as the polar solvent material. A smectite clay-based thixotropic thickener also may be used in varying amounts to produce a well-defined screen-printed pattern of the silica slurry on the embossed thermoplastic web.

In its preferred embodiment, the primary particle size of the silica is about 18 nanometers, and the agglomerated particle size of the hydrophobic silica in its final form is about 5 microns. However, it will be understood that the only critical limination on the particle size is such that the area in which it is deposited will be substantially impervious to the backcoating material 32, whereby the backcoating material is unable to penetrate the hydrophobic silica and interact with the cube-corner pattern except in those areas devoid of the silica.

The particular combination of solvents and thickeners is important to satisfactory deposition and definition of the silica in a precise and accurate pattern. Screen printing of particulate material commonly requires use of resins or other binders to hold the deposited particles in place. A resin or binder cannot however be used in this instance because of the adverse effect on reflectivity of the web because of refractive index similarities.

Another important consideration is the rheology, or flow characteristics of the silica slurry as it is forced through the printing screen. The slurry must "relax", or thin as it is forced through the screen apertures, and thereafter regain sufficient viscosity to retain a well-defined pattern with good leveling qualities and appearance characteristics. Yet another consideration is use of a solvent vehicle which obtains the aforementioned qualities without attacking or degrading the thermoplastic web upon which the retroreflective pattern is formed.

Use of polar solvents, such as n-butanol, enables the slurry to maintain an increased concentration of solids (silica). Such solvents, however, react with the thermoplastic material used to form the web. Non-polar solvents, such as low odor mineral spirits, preserve the embossed web, yet do not act to provide a satisfactory silica pattern. Therefore a blend of polar and selected non-polar solvents has been found to be useful in carrying enough solids without degrading reflectivity or degrading the web.

Preferably, the hydrophobic silica is present in proportions ranging from about 15 percent to about 35 percent by weight, the non-polar solvent carrier is present in amounts ranging from about 40 percent to about 70 percent, the polar solvent is present in amounts ranging from about 10 percent to about 30 percent, and the thickening agent may be present in amounts from about 2 percent to about 8 percent. One preferred formulation of the silica mixture includes 32 percent by weight Sipernat D10 hydrophobic silica, 48.9 percent low odor mineral spirits, 15.6 percent n-butanol, and 3.2 percent thickener. It has been found that such proportions preserve the web while providing a useful silica pattern.

After application of the silica mixture, web 26 is passed through a heating oven 56 where the resulting silica pattern is heated to drive off the organic solvents without heating web 26 to the point where heat distortion of the cube-corner elements of the laminate will occur.

After drying, the silica is mechanically held to the cube-corner elements on the reverse face 30 of web 26 by, it is believed, electrostatic forces and physical inter-engagement of the silica particles themselves.

Thus, as web 26 exits mixture application station 48, it has taken on the form of a first modified laminate 58, i.e., a web 26 having cube-corner elements with a precisely formed pattern of silica mixture screened thereon over a portion of the elements, with an uncovered portion of the cube-corner elements still exposed. As modified laminate 58 exits drying over 56, it takes on a second modified laminate construction 60 wherein the solvents present in the silica mixture have been driven off and the silica itself has remained dried into its screened-on pattern.

The second modified laminate 60 then enters a backcoating application station 62. The application of a water-based backcoating accomplishes several results. First, those areas onto which no silica has been screened or deposited will allow direct contact between the backcoating and the reverse side 30 of the embossed or otherwise formed thermoplastic web 26, thus "wetting" web 26 with the liquid backcoating mixture. Second, a layer of backcoating material will overlay the silica pattern formed on thermoplastic web 26 and, when applied effectively, will not disturb or disrupt the printed or screened-on silica pattern. Third, the backcoating may then be dried and/or cured to provide firm attachment to thermoplastic web 26 to provide a flat, smooth and integral surface upon which further layers, such as a layer of pressure sensitive or heat-activated adhesive may be effectively and conveniently applied, and to protectively cover or encapsulate the silica pattern. A surprising and unexpected result is that the silica prevents permeation of the liquid backcoating to the cube-corner pattern. As described above, such permeation would adversely affect the reflectivity of the final assembled laminate.

Application of the backcoating mixture to the second modified laminate 60 may be accomplished in a number of ways, such as by spraying, roller application, squeegeeing, or the like. The manner in which the backcoat is applied will be determined by, inter alia, the precise formulation of the backcoat and the pressure, or force, which can be withstood by the silica pattern after it has been dried.

For purposes of illustration, a backcoating application station 62 may be characterized as having a supply header or tank 64 communicating with an application means 66 which may be a nozzle or series of nozzles, or the like. An implement such as a doctor blade 68 may be used to more uniformly spread the backcoating after it has been applied without damaging the silica pattern. A platen 70 provides support for the second modified laminate 60 during application of the backcoat.

After application, the third modified laminate 72 enters drying oven 74 wherein the backcoat material is heat-cured, resulting in backcoating layer 32 as shown in FIG. 1.

Successful use of a backcoating requires that the backcoating formulation meet several particularly important working parameters. One is that the backcoating have flow characteristics such that the relatively narrow and shallow runners formed by the silica pattern will be filled, while not dewetting or disturbing the dried silica pattern itself. This means that the viscosity of the backcoating must be carefully controlled to assure that the backcoating can be applied while completely encapsulating the dried silica without disturbing the silica pattern. Another characteristic is that the backcoating cannot penetrate or interact with the applied silica to reach the interface between the silica and the cube-corner pattern. Yet another requirement is that the backcoating, when dried, have the required flexibility and toughness to withstand use in a laminate. Ideally, the backcoating would also be of a color which enhances daytime visibility of articles made with such laminates.

Several preferred backcoatings have been utilized. Each may be characterized generally as including a water-borne or water-based polymeric mixture or system, a whitening agent, a defoamer, a thickener for use in adjusting the final viscosity, and a pH-adjusting component.

A first preferred formulation of a backcoating is presented herewith as Example 1:

EXAMPLE 1

| | |
|---|---|
| 1. DP-101, a water-borne polymeric system consisting of about 34% acrylic/urethane copolymer, 60% water and 5% coalescent solvent, such as M-pyrol | 70% to 90% by weight |
| 2. UCD-1060Q, a pre-dispersed coloring agent (titanium dioxide) containing about 72% solids | 6% to 24% |
| 3. BYK-W, a defoamer | 0.4% to 0.9% |
| 4. TT 615 (50 percent in water) acrylic/based thickener to adjust viscosity | 1.5% to 3.5% |
| 5. De-ionized water (anti-skinning and flow adjusting agent) | None to 5% |
| 6. Ammonia (28 percent aqueous solution) to adjust pH to 8.5 to 10.0 | None to 0.3% |

The foregoing mixture is formed by adding the defoamer to the water-borne acrylic/urethane copolymer system with gentle stirring. Thereafter, the coloring agent and the ammonia, if necessary, are added as gentle stirring is continued. The thickener is thereafter added with increasing blade speed and the entire mixture is stirred for about 30 minutes at moderate speed. A preferred mixer for such an operation is manufactured by Meyers Engineering of Bell, Calif. under the trade or model designation "550."

One preferred formulation used is blended as follows:

| DP-101 | 80.7% by weight |
|---|---|
| UCD-1060Q | 11.6 |
| TT 615 | 2.1 |
| BYK-W | 0.5 |
| Deionized Water | 4.2 |
| Ammonia | as needed |

DP-101 is a trade designation of Polyvinyl Chemical Industries, Inc. of Wilmington, Mass. While the precise formulation is not known, Polyvinyl Chemical Industries has assigned the trade designation DP-101 only to the particular urethane/acrylic copolymer resin utilized in the foregoing backcoat formulation. UCD-1060 is a trade designation of the Universal Color Dispersion Company on Lansing, Ill., used to identify a dispersion product for water-based systems. DYK-W is a defoamer manufactured by Mallinckrodt of Melville, N.Y. BYK-W is a defoamer manufactured by Mallinckrodt of Melville, N.Y. TT 615 is a trade designation of the Rohm and Haas Company and is an acrylic-based thickening agent. M-pyrol is a trade designation of the G.A.F. Corporation used to identify a methylpyrolidine coalescent solvent. The amount of organic coalescent in the water based systems preferably should not exceed about 10% by formula weight, otherwise the backcoating might permeate the hydrophobic granular matter into the formed cube-corner pattern.

A second formulation for the backcoating mixture adds a cross-linking agent to improve durability. After the ingredients of Example 1 have been mixed, and immediately prior to application, a quantity of the foregoing mixture is placed in a mixing vessel, and a freshly prepared solution of cross-linking agent is mixed therewith. A preferred cross-linking agent generally is a polyfunctional aziridine, such as CX-100, manufactured by Poyvinyl Chemical Industries, Inc. of Wilmington, Mass. A preferred preparation consists of 35 lbs. of backcoating mixture combined with 150 grams of CX-100, dissolved in 150 grams of water. The cross-linking agent is added in a proportion of about 0.5% to 1.5%, by weight, of constituents 1 through 4 of Example 1.

The resulting backcoating may be applied in a single pass, or in successively applied layers. If, for example, two passes are used, it has been found advantageous to include about 0.5% of the cross-linking agent in the first pass, with the backcoating of the second pass containing about 1% of the cross-linking agent. After drying, the first pass will have produced a construction that is 1½-2 mils thick while, after the second pass, the total thickness will be 2½-3 mils thick.

In a preferred embodiment, the before-and-after composition of the cross-linked backcoating are as follows:

| | Slurry | After Drying |
|---|---|---|
| DP-101 | 80.7% by weight | 73.7% by weight |
| UCD-1060Q | 11.6 | 21.6 |
| BYK-W | 0.5 | 1.3 |

| | Slurry | After Drying |
|---|---|---|
| TT 615 | 2.1 | 0.8 |
| De-ionized water | 4.2 | Trace to none |
| CX-100 | 1.0 | 2.6 |

In this embodiment, the addition of the cross linking agent enhances the weatherability of the finished laminate by increasing the durability and toughness of the backcoating.

A second formulation of the backcoating material is herewith presented as Example 2.

EXAMPLE 2

| 1. Emulsion E-1829, a water-borne polymeric acrylic emulsion | 42.1% to 62.1% by weight |
|---|---|
| 2. Water | 2.2% to 12.2% |
| 3. Ethylene glycol, an anti-skinning flow improvement agent | 1.5% to 2.5% |
| 4. UCD 1060Q, a pre-dispersed coloring agent (titanium dioxide) | 26.2% to 36.2% |
| 5. Syloid 169, silicone dioxide flatting agent to prevent blocking | 3.2% to 5.2% |
| 6. Dimethylamino ethanol pH-adjusting solvent | 0.3% to 0.5% |
| 7. Balab 3017A defoamer | 0.6% to 1.0% |
| 8. Texanol solvent, a coalescent solvent for improved film formation | 1.4% to 1.6% |
| 9. TT 615 (50 percent in water) acrylic-based thickener to adjust viscosity | None to 1.6% |

The foregoing backcoating is prepared by adding the defoamer to the water-borne system with gentle mixing, then adding the water, the anti-skinning agent, the pre-dispersed whitening agent and the amine while continuing gentle mixing. Thereafter, the coalescent solvent is added. Blade speed is then increased and the thickener is added to adjust the viscosity to the desired level and the resulting mixture is then stirred at moderate speed for 30 minutes.

Emulsion E-1829 is a trade designation of the Rohm and Haas Company of Philadelphia, Pa., for an acrylic emulsion vehicle. Syloid is a trade designation of the Davidson Checmical Company, a division of W. R. Grace, of Baltimore, Md. for a silicon dioxide flatting agent. Texanol is a trade designation of the Eastmlent Chemical Products Company of Kingsport, Tenn. used to identify a coalescing agent. Balab 3017-A is a product of the Organics Division of Witco Chemical Corporation, New York, N.Y.

Referring now to FIG. 2, a partial sectional view of a schematic portion of embossed thermoplastic web 26 after application of both silica 34 and backcoating 32 is shown. As therein seen, reverse side 30 of thermoplastic web includes a series of valleys, indicated generally at 76. The valleys 76 schematically represent the cube-corner elements found in web 26 when the cube-corner pattern shown in FIG. 1 is embossed onto thermoplastic web 26. When the silica layer 34 is applied, the valleys 76 between adjacent cube-corner elements are filled (except where the screen pattern leaves web 26 exposed) and, in a preferred embodiment of the invention, enought silica 34 is applied to extend a distance of about 0.0001 to about 0.003 inch above the embossed surface of thermoplastic web 26, as characterized by dimension A of FIG. 2. In like fashion, the backcoat layer 32 is applied to a thickness B of about 0.002 to about 0.004 inch above the silica layer 34. Where runners or paths 42 are formed, each such runner consists of the backcoat material which extends downward to wet the floor of each valley 76 to a total depth C, as shown in FIG. 2 which, preferrably, is about 0.006 inch. In a preferred embodiment of the present invention, each such runner is 0.001 inch deep and, as characterized by dimension D in FIGS. 2 and 6, may be on the order of 0.015 inch wide.

In the embodiment herein illustrated, each discrete element of the applied silica pattern is square in shape with the length of each side of the square characterized by dimension E in FIGS. 2 and 6. As hereinabove described, the percentage of surface area available for retroreflection may be adjusted by adjusting the dimensions D and E as shown in FIGS. 2 and 6. Where, for example, dimension D is 0.015 inch and dimension E is 0.200 inch, the effective surface available for retroreflection is 84 percent. Where dimension D is 0.027 inch and dimension E is 0.138 inch, approximately 70 percent of the surface of the resulting sheet preserves retroreflective characteristics. With a dimension D of 0.029 inch and a dimension E of 0.096 inch, approximately 55 percent of the total surface of the resulting sheet retains retroreflective properties. In a preferred embodiment, dimension D is 0.030 inch and dimension E is 0.170 inch to give an effective area of reflection of about 73%.

Thus, the degree to which the resulting laminar sheet returns incident light towards its source may be adjusted independent of the actual cube-corner type pattern formed on thermoplastic web 26, in a manner which is much more convenient and efficacious than changing the mold dimensions or characteristics used to produce the embossed cube-corner pattern.

Referring again to FIGS. 1 and 4, after fourth modified laminate 84 exits drying oven 74, a pressure-sensitive or heat-activated adhesive layer 36 may then be applied by taking the resulting laminate 84 and drawing it past a station where a backing or release sheet 38, pre-coated with adhesive 36, may be layered directly onto backcoating 38, resulting in a completed laminate 22 as shown in FIG. 1. Finally, if a carrier sheet is used, it is stripped away, exposing obverse face 28 as the light-receiving surface of the finished laminate 22.

It should be noted that the foregoing examples and preferred embodiments have been presented with respect to a cube-corner embossed pattern having a depth characterized by dimension X in FIG. 2 of 0.004 inch. It is contemplated that patterns of varying depth and varying dimensions may be utilized, and that the dimension herein discussed for the depth of silica applied, and the width and depth of the runners thereby formed, may be varied without departing from the spirit and scope of the invention as herein discussed.

The finished sheet will have the physical characteristics enabling it to substantially meet specification FP-79 for reflective sheeting, and its reflective properties can easily be varied by utilizing different screen patterns. Moreover, the coloring achieved by the existing laminate backcoating substantially enhanced the daylight esthetics of the finished material. The heating of the laminate during the drying and curing of the silica, backcoating or adhesive, also may have an effect on the final reflective performance of the laminate, dependent upon the characteristics of the tools and the material chosen for the film. It has been determined that for optimum performance, the laminate should not be heated above 180° F. during these various processing steps for the preferred embodiment disclosed herein.

It may also be noted that while the silica pattern herein presented is a series of squares turned to present a diamond-like pattern, other cell sizes and shapes are also possible, wherever they appear efficacious for purposes of performance or appearance, and are within the spirit and scope of the invention as herein discussed and claimed.

Figure 7:
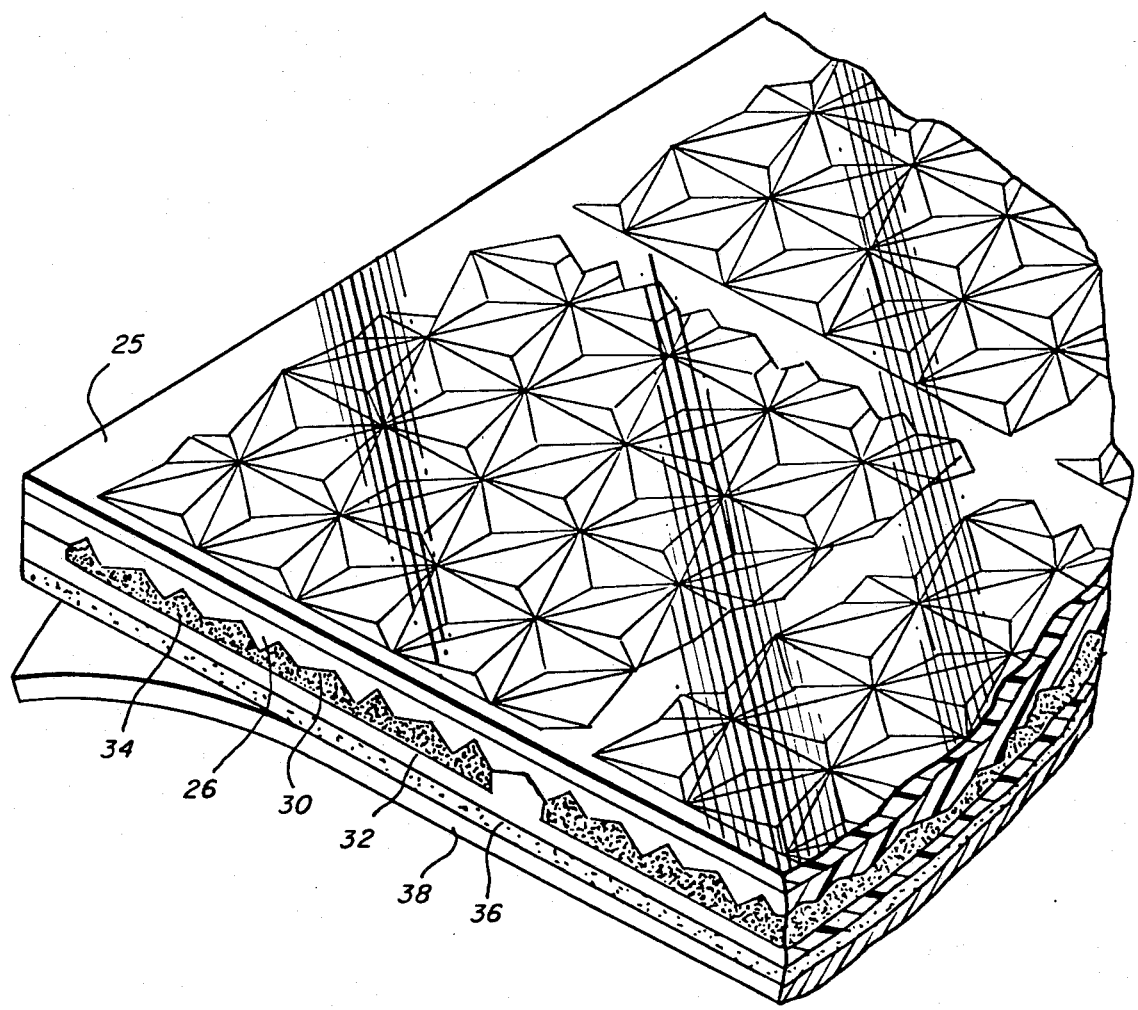
FIG. 7 is an enlarged perspective view illustrating a second preferred embodiment of the retroreflective sheeting of the present invention.

As previously noted, FIG. 7 illustrates another preferred embodiment of the present invention. In this embodiment, a layer 25 of a more weather resistant thermoplastic material than that forming web 26, such as UV modified or impact modified polymethyl methacrylate, or a combination thereof, is laminated to the impact modified acrylic forming web 26. In its preferred form, layer 25 will be about 1.7 mil and will not exceed 2.3 mil in thickness. It has been found that this added layer provides additional weathering characteristics needed for certain environments which, when not exceeding the noted thickness, permits the total laminate to remain sufficiently flexible. Preferred materials in this embodiment may be those sold under the trade designation VO52 or VO44 by the Rohm & Haas Company, or a polyarylate sold under the trade designation Ardel, by Union Carbide. Various techniques may be employed to apply this outer layer to the web before the silica and backcoating is applied. For example, the additional layer of thermoplastic material may be applied to solvent casting or may be co-extruded with the initial film.

A preferred formulation for the outer layer 25 includes use of Korad-D, the trade name of a modififed polymethyl methacrylate manufactured by Polymeric Extruded Products, Inc. of Newark, N.J. Such material includes U.V. light absorbing substances, and is crosslinked to a flexible, rubber base substance, adding flexibility. In particular, use of Tinuvin ®234, a benzotriazol compound manufactured by Geigy, is used as a UV inhibitor. This substance is known chemically as 2-(2H-benzotriazol-2-yl)-4-methyl-phenol. Korad D thermoplastic is described in U.S. Pat. No. 3,562,235, issued on Feb. 9, 1971.

When Korad D thermoplastic is used, it may be applied as a 2 mil outer layer during the cube forming process, or it may be co-extruded with the web 26 before such formation, in a layer 1 mil thick, or it may be applied in solution directly to the web 26 in a layer ½ mil thick. The particular thickness will depend in part on the total thickness parameters of the finished laminate.

While the foregoing has presented various specific preferred embodiments, it is to be understood that these embodiments have been presented by way of example only. It is expected that others will perceive differences which, while varying from the foregoing, do not depart from the spirit and scope of the invention as herein claimed and described.

What is claimed is:

1. A flexible retroreflective cube corner type laminate sheet construction including a thermoplastic web with a light-receiving and transmitting first side and a second side coextensive with said first side, and a cube corner type retroreflective pattern formed on at least a portion of said second side, said construction comprising:

a layer of hydrophobic granular material deposited on said second side to cover selected portions of said formed cube corner retroreflective pattern with remaining portions of said second side devoid of said hydrophobic granular material; and a layer of backcoating material deposited on said second side to substantially completely overly said hydrophobic granular material without disturbing the pattern formed by said granular material, said backcoating material substantially fully contacting said portions of said second side devoid of said granular material and being fixedly secured thereto, thereby encapsulating said hydrophobic granular material between said second side and said backcoating layer, the particle size of said hydrophobic granular material being such that the area in which it is deposited will be effectively impervious to said backcoating material whereby said backcoating material is unable to penetrate said granular material and interact with said second side except in the area devoid of said granular material.

2. The construction of claim 1, wherein said hydrophobic granular material is deposited so as to form a well-defined regular and repeating array.

3. The construction of claim 1, wherein said hydrophobic granular material is deposited so as to form a discrete, regularly-spaced array of pattern elements, each said pattern element being surrounded by contiguous portions of said second side devoid of said granular material.

4. The construction set forth in claim 3, in which said array of elements repeats itself in regular intervals.

5. The construction of claim 1, wherein said hydrophobic granular material is hydrophobic silica.

6. The construction of claim 1, wherein said hydrophobic granular material has a primary particle size of about 18 nanometers.

7. The construction of claim 1, wherein said hydrophobic granular material is hydrophobic silica.

8. The construction of claim 1, wherein said backcoating consists essentially of a polymeric or copolymeric, water-based system.

9. The construction of claim 8, wherein said backcoating includes a major proportion of an acrylic/urethane copolymer.

10. The construction of claim 8, wherein said backcoating includes a major proportion of a polymeric acrylic water-borne system.

11. The construction of claim 8, wherein said backcoating comprises an acrylic/urethane copolymer, a coloring agent, and an acrylic-based thickening agent.

12. The construction of claim 11, wherein said backcoating includes a defoaming agent.

13. The construction of claim 8, wherein said backcoating comprises a polymeric acrylic system, a coloring agent, and a thickening agent.

14. The construction of claim 8, wherein said backcoating comprises an acrylic/urethane copolymer, a coloring agent, a thickener and a cross-linking agent.

15. The construction of claim 14, wherein said backcoating includes a defoaming agent.

16. The construction of claim 15, wherein said backcoating, when dried, comprises of about the following constituents by weight: 73.7% acrylic/urethane copolymer; 21.6% coloring agent; 0.8% thickening agent; 1.3% defoaming agent; and 2.6% cross-linking agent.

17. The construction of claim 1, further including a lamina of flexible thermoplastic material co-extensive with and secured to said light-receiving and transmitting side of said thermoplastic web, said lamina including means for absorbing radiation in about the ultraviolet range.

18. The construction of claim 17, wherein said lamina is formed from polymethyl methacrylate in a thickness from about 0.2 mil to 0.4 mil.

19. The construction of claim 17 wherein said lamina is formed from a rubber-based cross-linked thermoplastic acrylic polymer composition, and said absorbing means is 2-(2H-benzotriazol-2-yl)-4-methyl-phenol.

20. The construction of claim 19, wherein said lamina is from about 0.5 mil to about 2.3 mil in thickness.

21. The construction of claim 1, further including a lamina of flexible thermoplastic material co-extensive with and secured to said light-receiving and transmitting side of said thermoplastic web, said lamina including a rubber-based cross-linked thermoplastic acrylic polymer composition.

22. A retroreflective cube corner laminate sheet construction comprising:

a thermoplastic web having a light-receiving and transmitting first side, and a second side coextensive with said first side;

said second side having a repeating retroreflective cube corner pattern formed on at least a portion thereof;

a layer of hydrophobic granular material disposed on said second side to cover selected portions of said formed cube corner pattern and leaving remaining area of said second side devoid of said hydrophobic granular material;

a layer of backcoating material deposited on said second side to overlay said hydrophobic granular material;

said backcoating material also contacting substantially all of said remaining area of said second side devoid of said hydrophobic granular material;

the particle size of said hydrophobic granular material being such that the area in which it is deposited will be effectively impervious to said backcoating material, whereby said backcoating material is unable to penetrate said granular material and interact with said second side except in said remaining area devoid of said granular material;

said backcoating material being in secure attachment to said second side at said remaining area, thereby encapsulating said granular material between said second side and said backcoating material;

a layer of adhesive applied to and generally co-extensive with said backcoating material; and a release sheet releably secured to said adhesive layer.

23. The construction of claim 22, wherein said hydrophobic granular material is deposited on said second side so as to form a regular and repeating array.

24. The construction of claim 23, wherein said array includes discrete, regularly-spaced pattern elements of selected geometric shape; and each said pattern element is surrounded by contiguous portions of said second side devoid of said hydrophobic granular materials.

25. The construction of claim 24, wherein said array comprises an array of square pattern elements;

said pattern elements defining therebetween a series of paths devoid of said hydrophobic granular material.

26. The construction of claim 22, wherein said hydrophobic granular material has a particle size of about 18 nanomters.

27. The construction of claim 22, wherein said hydrophobic granular material is hydrophobic silica.

28. The construction of claim 22, wherein said backcoating includes a major proportion of a water-borne acrylic-urethane copolymer.

29. The construction of claim 22, wherein said backcoating includes a major proportion of a polymeric acrylic water-borne system.

30. The construction of claim 24, wherein said hydrophobic granular material is hydrophobic silica.

31. The construction of claim 22, further including a lamina of flexible thermoplastic material co-extensive with and secured to said light-receiving and transmitting side of said thermoplastic web,
said lamina including means for absorbing radiation in about the ultraviolet range.

32. The construction of claim 31, wherein said lamina is formed from a rubber-based cross-liked thermoplastic acrylic polymer composition, and
said absorbing means is 2-(2H-benzotriazol-2-yl)-4-methyl-phenol.

33. The construction of claim 40, wherein said lamina is from about 0.5 mil to about 2.0 mil in thickness.

34. The construction of claim 22, wherein said lamina is formed from polymethyl methacrylate in a thickness from about 0.2 mil to 0.4 mil.

35. A method for producing a cube corner type retroreflective laminate sheet construction, said method comprising the steps of:
(a) applying a layer of hydrophobic granular material to a web of thermoplastic material having a retroreflective cube corner formed pattern on at least a portion of one side, said granular material deposited so as to form a regular and repeating array on said retroreflective pattern;
(b) forming, as part of said array a plurality of paths on said one side devoid of said hydrophobic granular material;
(d) applying a layer of backcoating material to overlay said hydrophobic granular material and to fill said paths; and
(d) adhering said backcoating material to encapsulate said hydrophobic granular material between said formed side and said backcoating material,
the particle size of said hydrophobic granular material being such that the area in which it is deposited will be effectively impervious to said backcoating material whereby said backcoating material is unable to penetrate said granular material and interact with said second side except in the area devoid of said granular material.

36. The method of claim 35 wherein said layer of hydrophobic granular material consists initially of a slurry comprising a hydrophobic granular material, a polar solvent, and a non-polar solvent, said polar solvent and said non-polar solvent present in relative proportions sufficient to allow deposition of said hydrophobic granular material in said well-defined array on said thermoplastic web.

37. The method of claim 36, wherein said polar solvent is an aliphatic alcohol.

38. The method of claim 36, wherein said polar solvent is n-butanol.

39. The method of claim 36, wherein said non-polar solvent comprises low odor mineral spirits.

40. The method of claim 36, wherein said polar solvent is present in an amount from about 10% to about 30% of said slurry, and said non-polar solvent is present in an amount from about 40% to about 70% of said slurry.

41. The method of claim 36, wherein said polar solvent is present in an amount of about 15% of said slurry.

42. The method of claim 36, wherein said slurry consists of from about 15% to about 35% of said hydrophobic granular material, from about 10% to about 30% of said polar solvent, and from about 40% to about 70% of said non-polar solvent.

43. The method of claim 36, wherein said slurry includes a thixotropic thickener.

44. The method of claim 35 wherein said backcoating consists of the following constituents:
(a) a water-borne mixture of an acrylic/urethane copolymer in a proportion from about 70 perent to about 90 percent;
(b) a coloring agent in a proportion from about 6 percent to about 24 percent;
(c) a defoamer in a proportion from about 0.4 percent to about 0.9 percent;
(d) an acrylic-based thickening agent in a proportion from about 1.5 percent to about 3.5 percent;
(e) deionized water in a proportion from none to about 5 percent; and
(f) a pH-adjusting agent in a proportion from none to about 0.3 percent.

45. The method of claim 44, wherein said backcoating includes:
(g) an aqueous solution of a cross-linking agent in a proportion from about 0.5 percent to about 1.5 percent, by weight, of constituents (a)–(d).

46. The method of claim 35, wherein said backcoating consists of the following constituents:
(a) a water-borne polymeric acrylic system in a proportion from about 42 percent to about 62 percent;
(b) water in a proportion from about 2 percent to about 12 percent;
(c) an anti-skinning agent in a proportion from about 1.5 percent to about 2.5 percent;
(d) a coloring agent in a proportion from about 5 percent to about 36 percent;
(e) a flatting agent in a proportion from about 3 percent to about 5 percent;
(f) a pH-adjusting agent in a proportion from about 0.3 percent to about 0.5 percent;
(g) a defoamer in a proportion from about 0.6 percent to about 1.0 percent;
(h) a coalescent solvent in a proportion from about 1.0 percent to 1.6 percent; and
(i) a thickener in a proportion from 0 percent to 3.6 percent.

47. The method of claim 35, wherein said slurry includes a polar solvent and a non-polar solvent.

48. The method of claim 47, wherein said polar solvent is an aliphatic alcohol.

49. The method of claim 47, wherein said polar solvent is n-butanol.

50. The method of claim 47, wherein said non-polar solvent comprises low odor mineral spirits.

51. The method of claim 35, further including the step of:

(e) securing an overlayer of weather-resistant thermoplastic material containing absorbers of radiation in about the ultra-violet range, to that side of said web opposite to the side on which said cube corner type pattern is formed.

52. The method of claim 35, interposing between steps (b) and (c) the step of:
(b₁) drying said layer of hydrophobic granular material.

53. The method of claim 35, wherein said hydrophobic granular material is hydrophobic silica.

54. The method of claim 35, wherein substantially said entire second side is formed to contain cube corner elements therein and said backcoating adheres directly to portions of said cube corner elements devoid of said hydrophobic granular material.

55. A flexible cube corner type retroreflective laminate sheet construction including a retroreflective web with a light-receiving and transmitting first side and a second side co-extensive with said first side, and a cube corner type retroreflective pattern formed on at least a portion of said second side, said construction comprising:
a layer of hydrophobic granular material deposited on said second side to cover selected portions of said cube corner pattern, with the uncovered portions of said second side forming paths devoid of said granular material;
a layer of backcoating material deposited on said second side to overlay said hydrophobic granular material, said backcoating material contacting said uncovered portions of said cube corner pattern on said second side and being fixedly secured thereto, thereby encapsulating said granular material between said second side and said backcoating layer, the particle size of said hydrophobic granular material being such that the area in which it is deposited will be effectively impervious to said backcoating material wherein said backcoating material is unable to penetrate said granular material and interact with said second side pattern except in said uncovered portions; and
said paths being sized and shaped to cover a selected portion of the surface area of said cube corner pattern found in said second web side thereby to control the amount of incident light reflected from said first side of said retroreflective web, without changing said formed cube corner pattern on said second side.

56. The construction of claim 55, wherein said hydrophobic granular material is deposited so as to form a regularly-spaced array of discrete pattern elements,
each said pattern element being surrounded by contiguous portions of said paths.

57. The construction of claim 56, wherein said pattern elements are square.

58. The construction of claim 56, wherein each said pattern element is a square having sides of 0.200 inch and each said path is 0.015 inch wide.

59. The construction of claim 56, wherein each said pattern element is a square having sides of 0.138 inch wide and each said path is 0.127 inch wide.

60. The construction of claim 56, wherein each said element is a square having sides of 0.096 inch and each said path is 0.029 inch wide.

61. The construction of claim 56, wherein each said pattern element is a square having sides of 0.170 inch wide and each said path is 0.030 inch wide.

62. The construction of claim 55, wherein said paths define rectangular pattern elements.

63. The construction of claim 55, including a lamina co-extensive with and secured to said first side of said retroreflective web,
said lamina including means to absorb radiation in about the ultraviolet range on said retroreflective web.

64. The construction of claim 63, wherein said lamina is formed of polymethyl methacrylate in a thickness of about 0.2 mil to about 0.4 mil.

65. The construction of claim 63, wherein said lamina is formed from a rubber-based, cross-linked thermoplastic acrylic polymer composition.

66. The construction of claim 63, wherein said absorbing means is 2-(2H-benzotriazol-2-yl)-4-methylphenol.

67. The construction of claim 1, 22 on 55, wherein substantially the entire second side is formed to contain cube corner elements therein and said backcoating adheres directly to portions of said cube corner elements devoid of said hydrophobic granular material.

* * * * *

UNITED STATES PATENT AND TRADEMARK OFFICE
CERTIFICATE OF CORRECTION

PATENT NO. : 4,618,518
DATED : October 21, 1986
INVENTOR(S) : Robert M. Pricone et al.

It is certified that error appears in the above—identified patent and that said Letters Patent is hereby corrected as shown below:

In the Specification:

Col. 1, line 53, change "onditions" to --conditions--.

line 57, change "constructins to --constructions--.

Col. 2, line 22, change "thereof" to --thereon--.

Col. 3, line 6, change "heate" to --heated--.

line 47, change "us" to --use--.

Col. 4, line 8, change "pettern" to --pattern--.

line 17, change "procedured" to --procedure--.

Col. 7, line 21, change "throught" to --through--.

line 34, change "misture" to --mixture--.

line 66, change "direct" to --directed--.

Col. 11, line 25, delete "DYK-W is a defoamer manufactured by Mallinckrodt of Melville, N. Y.".

Col. 11, line 45, change "Poyvinyl" to --Polyvinyl--.

Col. 12, line 51, change "Checmical" to --Chemical--.

line 53, change "Eastmlent" to --Eastment--.

UNITED STATES PATENT AND TRADEMARK OFFICE
CERTIFICATE OF CORRECTION

PATENT NO. : 4,618,518      Page 2 of 2
DATED : October 21, 1986
INVENTOR(S) : Robert M. Pricone et al.

It is certified that error appears in the above—identified patent and that said Letters Patent is hereby corrected as shown below:

Col. 13, line 2, change "enought" to --enough--.

line 11, change "preferrably" to --preferably--.

In the Claims:

Col. 15, line 9, change "overly" to --overlay--.

Col. 16, line 56, change "releably" to --reliably--.

Col. 17, line 6, change "nanomters" to --nanometers--.

line 24, change "cross-liked" to --cross-linked--.

line 46, change "(d)" to --(c)--.

Col. 18, line 22, change "perent" to -- percent--.

Signed and Sealed this

Eighth Day of September, 1987

*Attest:*

DONALD J. QUIGG

*Attesting Officer*      *Commissioner of Patents and Trademarks*